US010509504B2

(12) United States Patent
Ding et al.

(10) Patent No.: US 10,509,504 B2
(45) Date of Patent: Dec. 17, 2019

(54) DISPLAY SUBSTRATE, TOUCH PANEL AND DISPLAY APPARATUS

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xiaoliang Ding, Beijing (CN); Xue Dong, Beijing (CN); Haisheng Wang, Beijing (CN); Xiaochuan Chen, Beijing (CN); Yingming Liu, Beijing (CN); Shengji Yang, Beijing (CN); Wei Liu, Beijing (CN); Pengpeng Wang, Beijing (CN); Changfeng Li, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 70 days.

(21) Appl. No.: 15/529,926

(22) PCT Filed: May 26, 2016

(86) PCT No.: PCT/CN2016/083438
§ 371 (c)(1),
(2) Date: May 25, 2017

(87) PCT Pub. No.: WO2017/156872
PCT Pub. Date: Sep. 21, 2017

(65) Prior Publication Data
US 2018/0046277 A1    Feb. 15, 2018

(30) Foreign Application Priority Data
Mar. 17, 2016  (CN) .......................... 2016 1 0154453

(51) Int. Cl.
*G06F 3/041*  (2006.01)
*G06F 3/044*  (2006.01)
(Continued)

(52) U.S. Cl.
CPC .......... *G06F 3/04144* (2019.05); *G06F 3/044* (2013.01); *G06F 3/0412* (2013.01);
(Continued)

(58) Field of Classification Search
CPC ................... G06F 3/0412; G06F 3/044; G06F 2203/04103; G06F 2203/04105
See application file for complete search history.

(56) References Cited

U.S. PATENT DOCUMENTS

| 5,610,629 A * | 3/1997 | Baur ..................... G06F 3/0412 345/104 |
| 2008/0100587 A1* | 5/2008 | Sano ....................... G06F 3/041 345/173 |

(Continued)

FOREIGN PATENT DOCUMENTS

| CN | 102236447 A | 11/2011 |
| CN | 103988433 A | 8/2014 |

(Continued)

OTHER PUBLICATIONS

First Office Action for Chinese Patent Application No. 201610154453.9 dated Mar. 5, 2018.

(Continued)

*Primary Examiner* — David Tung
(74) *Attorney, Agent, or Firm* — Calfee, Halter & Griswold LLP

(57) ABSTRACT

A display substrate is disclosed. The display substrate includes a plurality of pressure sensitive units each including an input electrode electrically connected to one of a plurality of signal input lines, an output electrode electrically con-
(Continued)

nected to one of a plurality of signal output lines, and a pressure sensitive element operable to, responsive to a voltage difference applied across the input electrode and the output electrode and a pressure caused by pressing, generate a current signal indicative of a magnitude of the pressure. Also disclosed are a touch panel and a display apparatus.

13 Claims, 3 Drawing Sheets

(51) Int. Cl.
*G06F 3/14* (2006.01)
*G06F 3/047* (2006.01)

(52) U.S. Cl.
CPC .............. *G06F 3/0414* (2013.01); *G06F 3/14* (2013.01); *G06F 2203/04103* (2013.01); *G06F 2203/04105* (2013.01); *G06F 2203/04106* (2013.01); *G06F 2203/04112* (2013.01)

(56) References Cited

U.S. PATENT DOCUMENTS

| | | |
|---|---|---|
| 2014/0292699 A1 | 10/2014 | Ando |
| 2014/0362000 A1* | 12/2014 | Seo ..................... G02F 1/13394 |
| | | 345/173 |
| 2015/0070305 A1 | 3/2015 | Seo et al. |
| 2015/0355771 A1 | 12/2015 | Watazu et al. |
| 2016/0117035 A1 | 4/2016 | Watazu et al. |
| 2017/0139518 A1* | 5/2017 | Oh ........................ G06F 3/0414 |
| 2017/0235414 A1 | 8/2017 | Ding et al. |

FOREIGN PATENT DOCUMENTS

| | | |
|---|---|---|
| CN | 105068695 A | 11/2015 |
| CN | 105117058 A | 12/2015 |
| CN | 105144043 A | 12/2015 |
| CN | 105283743 A | 1/2016 |
| KR | 20130143201 A | 12/2013 |

OTHER PUBLICATIONS

International Search Report for Chinese International Application No. PCT/CN2016/083438 dated Dec. 20, 2016.

* cited by examiner

DISPLAY SUBSTRATE, TOUCH PANEL AND DISPLAY APPARATUS

CROSS-REFERENCE TO RELATED APPLICATIONS

The present application is the U.S. national phase entry of PCT/CN2016/083438, with an international filing date of May 26, 2016, which claims the benefit of Chinese Patent Application No. 201610154453.9, filed on Mar. 17, 2016, the entire disclosures of which are incorporated herein by reference.

TECHNICAL FIELD

The present disclosure relates to the field of display technologies, and particularly to a display substrate, a touch panel and a display apparatus.

BACKGROUND

With the fast development of display technologies, touch panels have found wide applications. Current touch panels are however provided with only a capability of performing detection in a two-dimensional plane (i.e., they can only detect a touch position of a finger or stylus on the surface of the touch panel), without being able to detect a pressure applied in a direction perpendicular to the surface of the touch panel.

SUMMARY

Embodiments of the present disclosure provide a display substrate which may be used for providing a touch panel with a capability of pressure detection. Also provided are a touch panel including the display substrate and a display apparatus including the touch panel.

According to an aspect of the present disclosure, a display substrate is provided which comprises a plurality of signal input lines, a plurality of signal output lines intersecting the signal input lines, and a plurality of pressure sensitive units. Each of the pressure sensitive units is formed at a respective one of intersections of the plurality of signal input lines and the plurality of signal output lines and comprises an input electrode electrically connected to one of the plurality of signal input lines, an output electrode electrically connected to one of the signal output lines, and a pressure sensitive element operable to, responsive to a voltage difference applied across the input electrode and the output electrode and a pressure caused by pressing, generate a current signal indicative of a magnitude of the pressure. The current signal is output via the output electrode to the signal output line connected to the output electrode.

In some embodiments, the pressure sensitive elements of the plurality of pressure sensitive units are made of a metal oxide piezoelectric material.

In some embodiments, the display substrate further comprises a plurality of current-to-voltage converter circuits each electrically connected to a respective one of the plurality of signal output lines for converting the current signal into a voltage signal.

In some embodiments, the display substrate further comprises a plurality of data lines intersecting the plurality of signal input lines and a plurality of sub-pixels formed at intersections of the plurality of signal input lines and the plurality of data lines. The data lines extend in the same direction as the signal output lines, and the plurality of signal input lines are reused as gate lines for the sub-pixels.

In some embodiments, the display substrate further comprises touch electrodes for touch sensing. The signal output lines are electrically connected to respective ones of the touch electrodes and reused as touch electrode leads for transmission of touch sensing signals.

In some embodiments, the pressure sensitive units are arranged on the display substrate in one-to-one correspondence with the sub-pixels.

In some embodiments, the pressure sensitive units are arranged in gaps among the sub-pixels.

In some embodiments, the pressure sensitive units are arranged in areas of the display substrate where spacers are disposed.

In some embodiments, the plurality of sub-pixels comprise respective thin film transistors. Each of the thin film transistors has an active layer, and the pressure sensitive element is formed in the same layer as the active layer and is made of the same material as the active layer.

According to another aspect of the present disclosure, a touch panel is provided which comprises the display substrate as described above.

According to yet another aspect of the present disclosure, a display apparatus is provided which comprises the touch panel as described above.

These and other aspects of the present disclosure will be apparent from and elucidated with reference to the embodiment(s) described hereinafter.

BRIEF DESCRIPTION OF THE DRAWINGS

Further details, features and advantages of the disclosure are disclosed in the following description of exemplary embodiments in connection with the accompanying drawings, in which.

DETAILED DESCRIPTION

Figure 1:
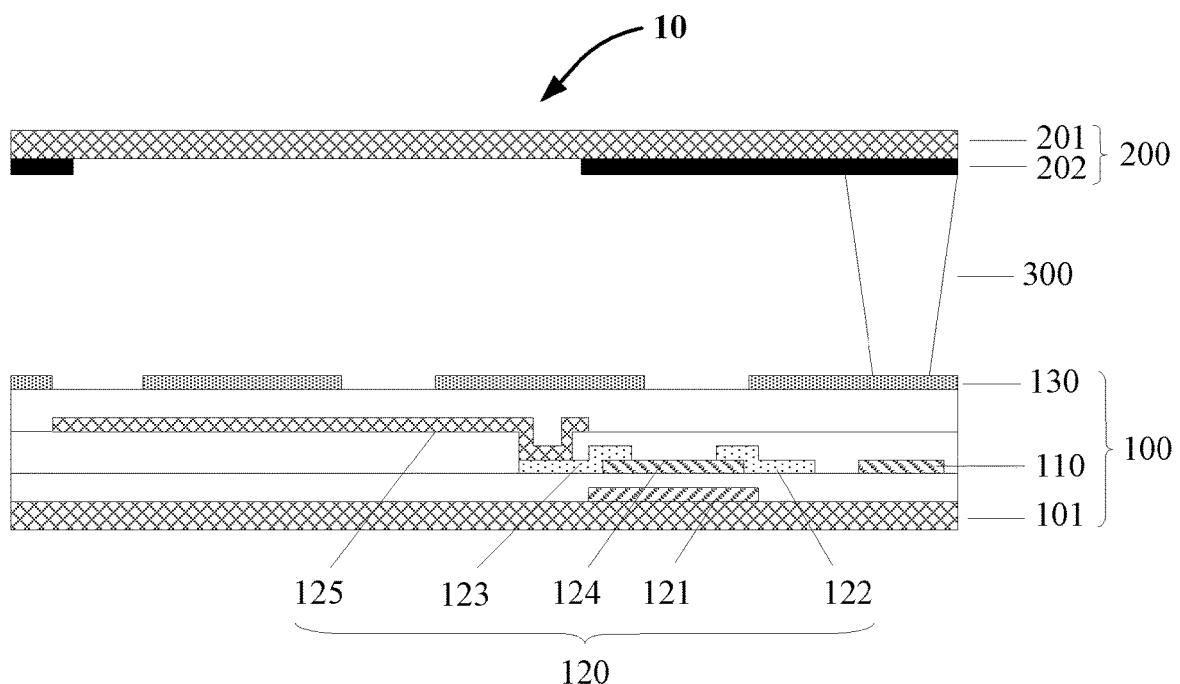
FIG. 1 is schematic cross-sectional view of a touch panel according to an embodiment of the present disclosure.

The disclosure will now be described more fully hereinafter with reference to the accompanying drawings, in which exemplary embodiments of the disclosure are shown. The present disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. Like reference numerals refer to like elements throughout.

It will be understood that, spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under"

other elements or features would then be oriented "above" the other elements or features. Thus, the exemplary terms "below" and "under" can encompass both an orientation of above and below. Terms such as "before" or "preceding" and "after" or "followed by" may be similarly used, for example, to indicate an order in which light passes through the elements. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present. In no event, however, should "on" or "directly on" be construed as requiring a layer to completely cover an underlying layer.

Embodiments of the disclosure are described herein with reference to schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is schematic cross-sectional view of a touch panel 10 according to an embodiment of the present disclosure.

Referring to FIG. 1, the touch panel 10 comprises a display substrate 100, an opposite substrate 200 that is opposite to the display substrate 100, and spacers 300 disposed between the display substrate 100 and the opposite substrate 200.

The display substrate 100 comprises a substrate body 101 and a plurality of pressure sensitive units 110 and a plurality of sub-pixels 120 that are formed on the substrate body 101. For simplicity, only one pressure sensitive unit 110 and one sub-pixel 120 are shown. The opposite substrate 200 comprises a substrate body 201 and a black matrix 202 formed on the substrate body 201.

In this embodiment, the pressure sensitive units 110 may be disposed in gaps among the sub-pixels 120 so as not to influence the aperture ratio. In this case, the pressure sensitive units 110 may be blocked by the black matrix 202, as shown in FIG. 1. Moreover, for an improvement of the responsiveness of the pressure sensitive units 110 that are arranged on the display substrate 100 to a pressure caused by pressing on the opposite substrate 200, the pressure sensitive units 110 may be arranged in areas of the display substrate 100 where the spacers 300 are disposed, as shown in FIG. 1.

In this embodiment, the display substrate 100 is illustrated as an array substrate for a liquid crystal display where each sub-pixel 120 comprises a pixel electrode 125 and an associated thin film transistor (TFT). Specifically, the TFT comprises a gate electrode 121 electrically connected to a gate line (not shown), a source electrode 122 electrically connected to a data line (not shown), a drain electrode electrically connected to the pixel electrode 125, and an active layer 124 disposed between the source electrode 122 and the drain electrode 123.

The display substrate 100 further comprises touch electrodes 130 for touch sensing. The arrangement of the touch electrodes 130 may be based on any known touch sensing techniques, such as a mutual-capacitance technique or a self-capacitance technique.

Other embodiments are possible. For example, the pressure sensitive units 110 and the touch electrodes 130 may be arranged on the opposite substrate 200 (the opposite substrate 200 may also be regarded as a type of display substrate). For another example, the display substrate 100 may also be an array substrate for an electroluminescent display or another type of display.

In addition, the touch panel 10 may be formed as a part of a display apparatus which may be any product or component having display functionality such as a cell phone, a tablet, a television, a monitor, a laptop, a digital photo frame, or a navigator.

Figure 2:
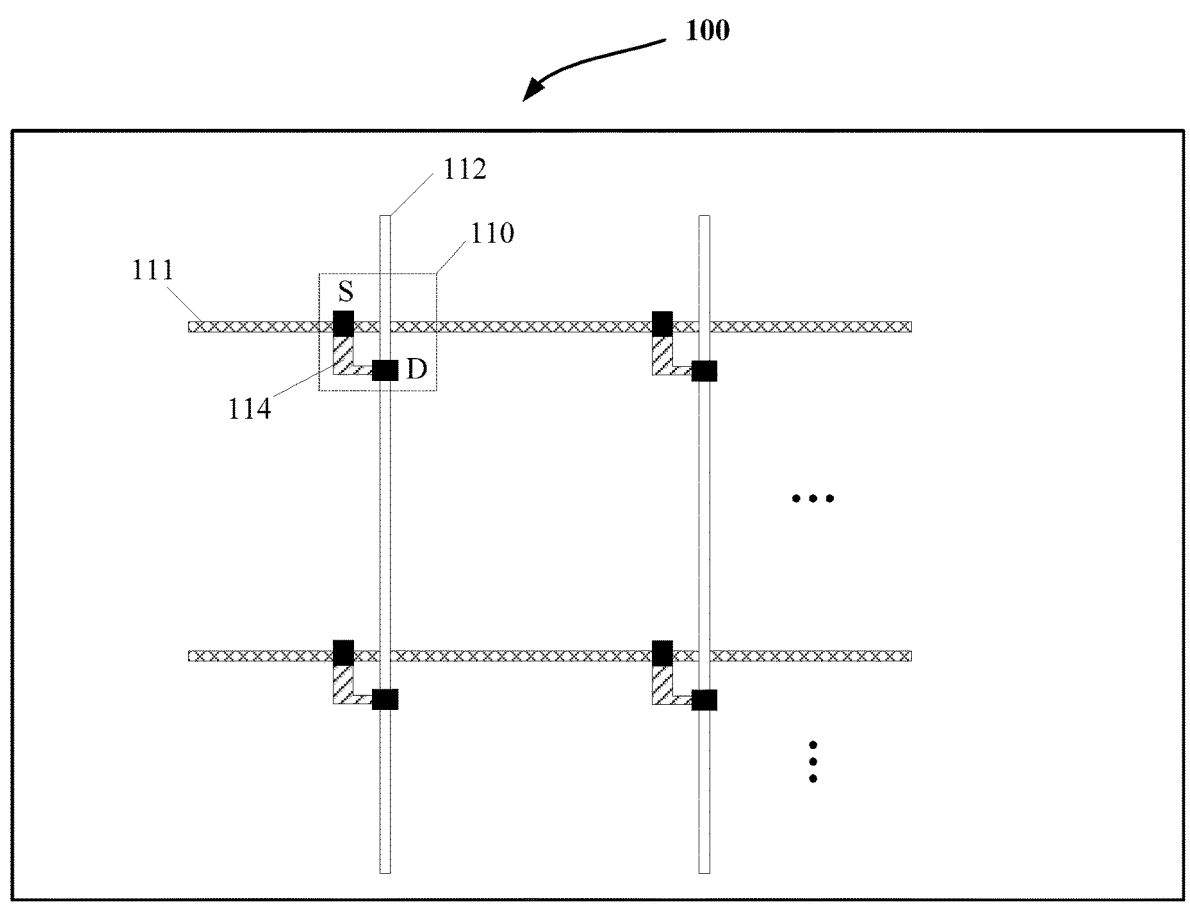
FIG. 2 is a schematic plan view of a display substrate according to an embodiment of the present disclosure.

FIG. 2 is a schematic plan view of a display substrate according to an embodiment of the present disclosure.

Referring to FIG. 2, the display substrate 100 comprises a plurality of signal input lines 111, a plurality of signal output lines 112 intersecting the signal input lines 111, and a plurality of pressure sensitive units 110. In the example of FIG. 2, the signal input lines extend laterally, and the signal output lines 112 extend longitudinally. It will be understood that in order not to obscure the subject matter of the present disclosure other potential components in the display substrate 100 are not shown in FIG. 2.

The dashed box in FIG. 2 denotes a pressure sensitive unit 110. Each pressure sensitive unit 110 is formed at a respective one of the intersections of the plurality of signal input lines 111 and the plurality of signal output lines 112. Specifically, the pressure sensitive unit 110 comprises an input electrode S electrically connected to the signal input line 111, an output electrode D electrically connected to the signal output line 112, and a pressure sensitive element 114. The pressure sensitive element 114 is operable to, responsive to a voltage difference applied across the input electrode S and the output electrode D and a pressure caused by pressing, generate a current signal indicative of a magnitude of the pressure. The current signal is output via the output electrode D to the signal output line 112 that is connected to the output electrode D.

In some embodiments, the pressure sensitive units 114 may be made of a metal oxide piezoelectric material such as ZnO. Since the metal oxide piezoelectric material is a semiconductor material, it can be used as a substitute for non-crystalline silicon or polycrystalline silicon for fabrication of the active layer of the TFT. In this case, the pressure sensitive unit 110 (and thus the pressure sensitive element 114) may be disposed in the same layer as the active layer 124 of the TFT of the sub-pixel 120, as shown in FIG. 1. In this way, both the active layer 124 and the pressure sensitive element 114 can be formed with a one-time patterning process, thereby reducing process steps.

Figure 3:
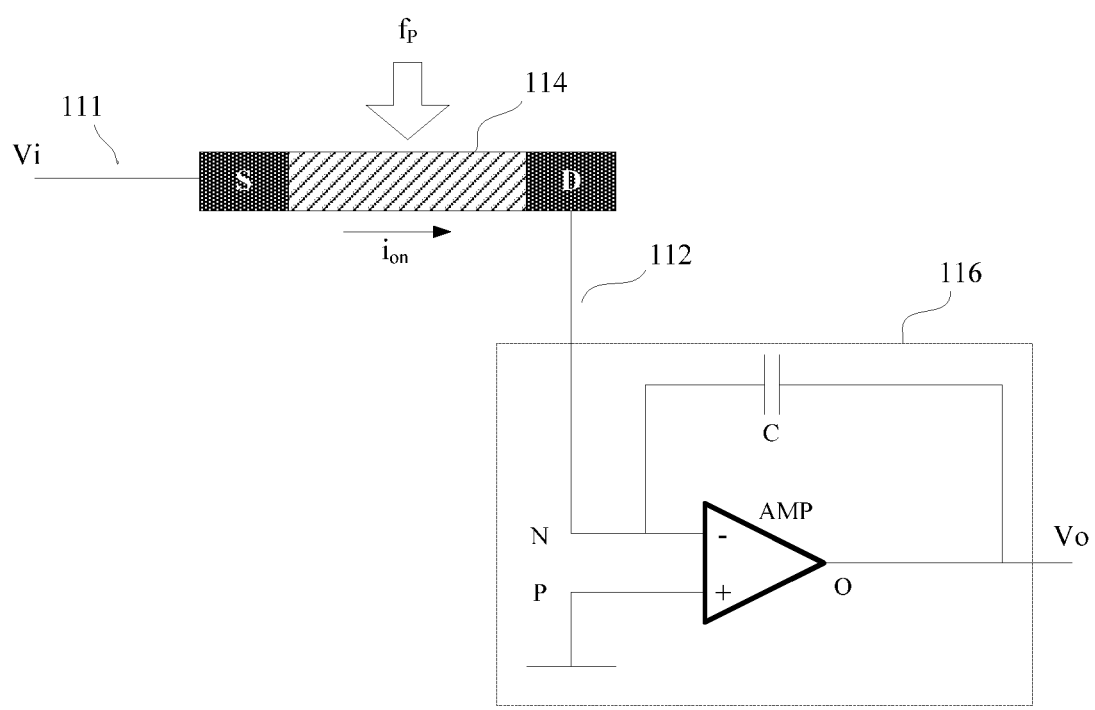
FIG. 3 is a schematic diagram showing an operation principle of the pressure sensitive unit in FIG. 2.

FIG. 3 is a schematic diagram showing an operation principle of the pressure sensitive unit 110 in FIG. 2.

Referring to FIG. 3, an input voltage Vi is applied to the input electrode S of the pressure sensitive unit 110 through the signal input line 111, and a force fp is applied on the pressure sensitive element 114 of the pressure sensitive unit 110. The input voltage Vi is typically a direct current voltage having a predetermined magnitude, which leads to creation of a predetermined voltage difference across the input electrode S and output electrode D of the pressure sensitive unit 110. In response to application of the force fp, the pressure sensitive element 114, which is a metal oxide piezoelectric material, generates a gate potential that controls over a magnitude of a current $i_{on}$ that flows through a channel between the input electrode S and output electrode D. The greater the force fp, the larger the current $i_{on}$ is. Thus, the current $i_{on}$ may be supplied to subsequent circuits for detection of the force fp by way of the signal output line 112 that is electrically connected to the output electrode D.

In some embodiments, the signal output line 112 supplies the current $i_{on}$ to a current-to-voltage converter circuit 116. In a non-limiting example, the current-to-voltage converter circuit 116 comprises an amplifier AMP and a capacitor C connected across a negative input terminal N and an output terminal O of the amplifier AMP, with a positive terminal P of the amplifier being grounded. Thus, a voltage difference Vi is created across the input electrode S and output electrode D, and the capacitor C is charged by the current $i_{on}$ generated responsive to the force fp. The magnitude of the force fp can be detected by detecting a voltage Vo at the output terminal O of the amplifier AMP.

A touch detecting phase and a display phase generally occur time-divisionally when the touch panel is in operation. In some embodiments, pressure detection may be performed in synchronization with the display phase such that the pressure detection will not additionally occupy the time period for displaying. Specifically, in the display phase, the signal input lines 111 are successively supplied with the input voltage Vi, and the output signals $i_{on}$ of respective pressure sensitive units 110 that are currently being supplied with the input voltage Vi are picked up from respective signal output lines 112. The position and magnitude of the pressure applied on the surface of the touch panel may then be detected by detection of the output currents $i_{on}$ or the output voltages Vo converted therefrom.

Figure 4:
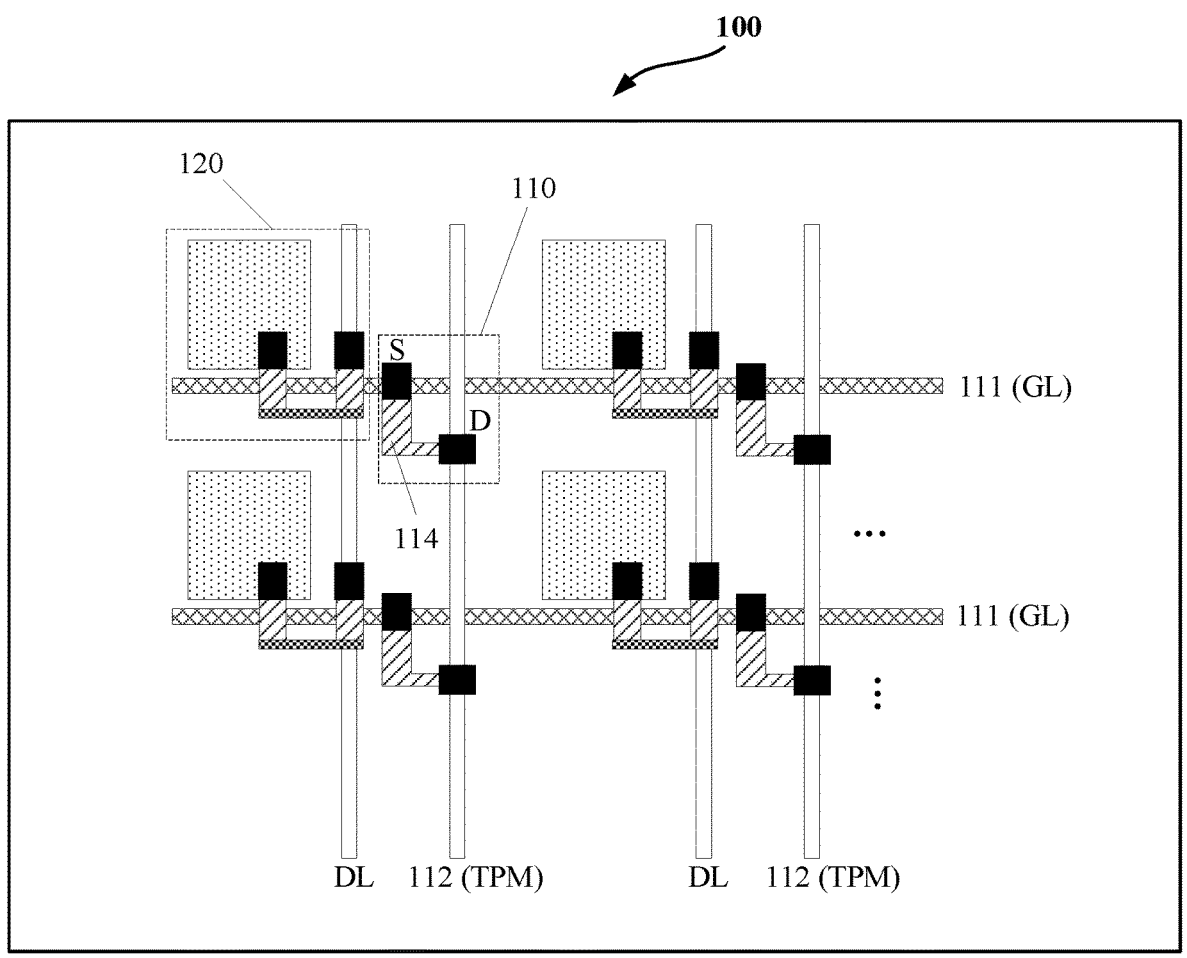
FIG. 4 is a schematic plan view of a display substrate according to an embodiment of the present disclosure.

FIG. 4 is a schematic plan view of a display substrate 100 according to an embodiment of the present disclosure.

Referring to FIG. 4, the display substrate 100 comprises a plurality of data lines DL and a plurality of signal output lines 112 that intersect a plurality of signal input lines 111, a plurality of sub-pixels 120 that are formed at intersections of the plurality of signal input lines 111 and the plurality of data lines DL, and a plurality of pressure sensitive units 110 that are formed at intersections of the plurality of signal input lines 111 and the plurality of signal output lines 112. The data lines DL extend in the same direction as the signal output lines 112. It will be understood that in order not to obscure the subject matter of the present disclosure other potential elements in the display substrate 100 are not shown in FIG. 4.

In this embodiment, the signal input lines 111 are reused as gate lines GL for the sub-pixels 120. In this way, wiring in the display substrate 100 may be simplified.

In the example of FIG. 4, the pressure sensitive units 110 are arranged on the display substrate 100 in one-to-one correspondence with the sub-pixels 120. In the display phase, the gate lines GL are successively supplied with a gate scan pulse. When the high level of the gate scan pulse is applied to a certain gate line GL, the thin film transistors electrically connected to that gate line GL are turned on, and the input electrodes S of the pressure sensitive units 110 electrically connected to that gate line GL are supplied with the high level. At this point, if a certain pressure sensitive unit 110 is subjected to a pressure, a current signal will be harvested by the signal output line 112 connected to the output electrode D of that pressure sensitive unit 110. This current signal is indicative of the magnitude of the pressure.

Due to a high input impedance of the gate line GL, the load of the gate line GL would not be influenced significantly by the current generated by the pressure sensitive unit 110. I.e., the voltage on the gate line GL would not be much affected by the pressure sensitive unit 110. Therefore, the display functionality would not be affected by the pressure detection performed by the pressure sensitive unit 110.

For a further simplification of the wiring in the display substrate 100, the signal output lines 112 may be reused as touch electrode leads TPM that are electrically connected to the touch electrodes 130 in FIG. 1, as shown in FIG. 4. In the display phase, the touch electrode leads TPM are used to transfer output signals from the pressure sensitive units 110. In the touch phase, the touch electrode leads TPM are used to transfer touch sensing signals from the touch electrodes 130.

The pressure sensitive units 110 may also be arranged depending on a pressure sensing accuracy required. In some embodiments, the number of the pressure sensitive units 110 may be less than that of the sub-pixels 120. I.e., the pressure sensitive units 110 are distributed on the display substrate 100 more sparsely than the sub-pixels 120.

In addition, in embodiments where the pressure sensitive element 114 of the pressure sensitive unit 110 is disposed in the same layer as the active layer (not shown in FIG. 4) of the thin film transistor TFT of the sub-pixel 120, the input electrode S of the pressure sensitive unit 110 may be connected to a corresponding gate line GL by means of a via (not shown), and the output electrode D may also be connected to a corresponding touch electrode lead TPM by means of a via (not shown).

According to embodiments of the present disclosure, multiple pressure sensitive units are incorporate into a touch panel to achieve pressure sensing. This requires only a small modification to the structure of the touch panel. In addition, the reuse of the wirings may provide desired detection accuracy and reduced manufacturing cost.

Various variations and modifications to the present disclosure may be made by those skilled in the art without departing from the spirit and scope of the present disclosure. Thus, if these variations and modifications to the present disclosure fall within the scope of the appended claims and equivalents thereof, the present disclosure is intended to encompass these modifications and variations.

What is claimed is:

1. A display substrate comprising:
   a plurality of signal input lines;
   a plurality of signal output lines intersecting the signal input lines;
   a plurality of data lines intersecting the plurality of signal input lines, and a plurality of sub-pixels formed at intersections of the plurality of signal input lines and the plurality of data lines; and
   a plurality of pressure sensitive units each formed at a respective one of intersections of the plurality of signal input lines and the plurality of signal output lines, wherein the plurality of pressure sensitive units each comprise:
      an input electrode electrically connected to a corresponding one of the plurality of signal input lines;
      an output electrode electrically connected to a corresponding one of the plurality of signal output lines; and
      a pressure sensitive element responsive to a voltage difference applied across the input electrode and the output electrode and a pressure caused by pressing, wherein the pressure sensitive element is operable to generate a current signal indicative of a magnitude of the pressure, wherein the current signal is output via the output electrode to the corresponding one of the plurality of signal output lines,
   wherein the input electrode and the output electrode are arranged such that the input electrode does not overlap the output electrode when viewed from above, and
   wherein the pressure sensitive element comprises a portion not overlapping the input electrode and the output electrode when viewed from above, and the portion comprises a first end connected to the input electrode and a second end connected to the output electrode,
   wherein the pressure sensitive elements of the plurality of pressure sensitive units are made of a metal oxide piezoelectric material,
   wherein the data lines extend in a same direction as the signal output lines, and wherein the plurality of signal input lines are reused as gate lines for the sub-pixels,
   wherein the plurality of sub-pixels comprise respective thin film transistors each having an active layer, and wherein the pressure sensitive element is formed in a same layer as the active layer and is made of a same material as the active layer.

2. The display substrate of claim 1, further comprising a plurality of current-to-voltage converter circuits each electrically connected to a respective one of the plurality of signal output lines for converting the current signal into a voltage signal.

3. A touch panel comprising the display substrate of claim 2.

4. The display substrate of claim 1, further comprising touch electrodes for touch sensing, wherein the signal output lines are electrically connected to respective ones of the touch electrodes and reused as touch electrode leads for transmission of touch sensing signals.

5. A touch panel comprising the display substrate of claim 4.

6. The display substrate of claim 1, wherein the pressure sensitive units are arranged in one-to-one correspondence with the sub-pixels.

7. A touch panel comprising the display substrate of claim 6.

8. The display substrate of claim 1, wherein the pressure sensitive units are arranged in gaps among the sub-pixels.

9. The display substrate of claim 8, wherein the pressure sensitive units are arranged in areas of the display substrate where spacers are disposed.

10. A touch panel comprising the display substrate of claim 9.

11. A touch panel comprising the display substrate of claim 8.

12. A touch panel comprising the display substrate of claim 1.

13. A display apparatus comprising the touch panel of claim 12.

* * * * *